United States Patent [19]

Yang

[11] 4,147,948
[45] Apr. 3, 1979

[54] APPARATUS FOR X-RAY RADIOGRAPHY
[75] Inventor: Kei-Hsiung Yang, Schenectady, N.Y.
[73] Assignee: General Electric Company, Schenectady, N.Y.
[21] Appl. No.: 903,603
[22] Filed: May 8, 1978

Related U.S. Application Data
[62] Division of Ser. No. 759,426, Jan. 14, 1977.
[51] Int. Cl.² .......................... H01J 39/06; H01J 31/49
[52] U.S. Cl. ................................ 313/101; 250/315 A; 313/96
[58] Field of Search ............... 313/101, 102, 374, 380, 313/388, 94, 96; 250/315 A, 759, 426

[56] References Cited
U.S. PATENT DOCUMENTS

| 3,327,151 | 6/1967 | Adams et al. ..................... 313/96 X |
| 3,769,059 | 10/1973 | Driard et al. ......................... 250/458 |
| 3,940,620 | 2/1976 | Houston et al. ................. 250/315 A |

Primary Examiner—Robert Segal
Attorney, Agent, or Firm—Geoffrey H. Krauss; Joseph T. Cohen; Marvin Snyder

[57] ABSTRACT

Apparatus for X-ray radiography includes a conductive cathode, receiving X-radiation differentially attenuated by passage through an object to be studied, and a conductive anode spaced from the cathode and bearing a sheet of insulative material upon which a charge image of the object is to be formed; and a structured photocathode extending from the cathode towards the anode. The photocathode, formed of cesium iodide and the like, is of relative great thickness and surface area to have large X-ray quantum absorption and photoelectron emission, whereby a lower exposure dosage of X-radiation is required for a radiographic exposure. A plurality of different photocathode structures are disclosed.

4 Claims, 5 Drawing Figures

U.S. Patent  Apr. 3, 1979  4,147,948
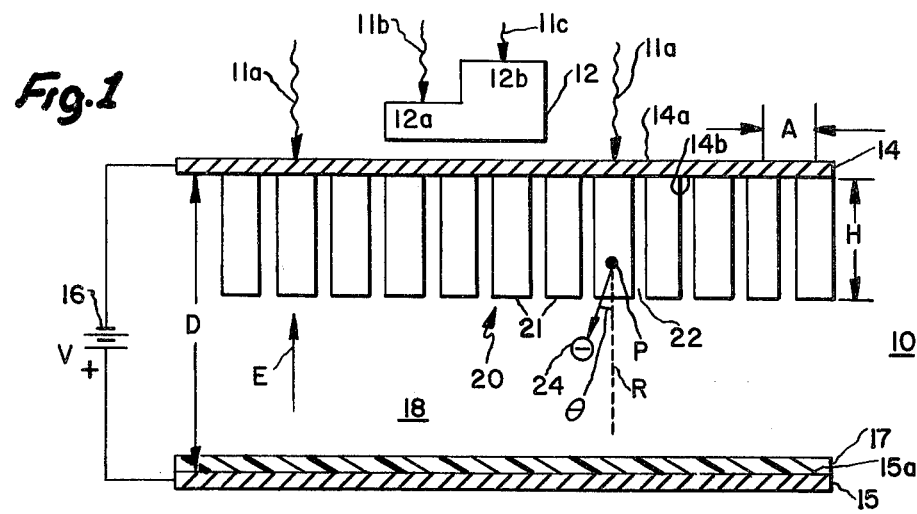
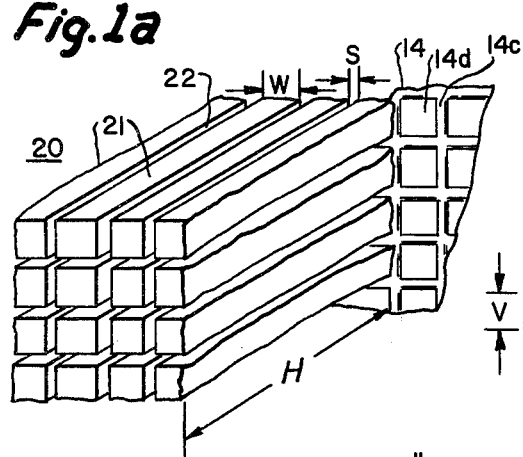
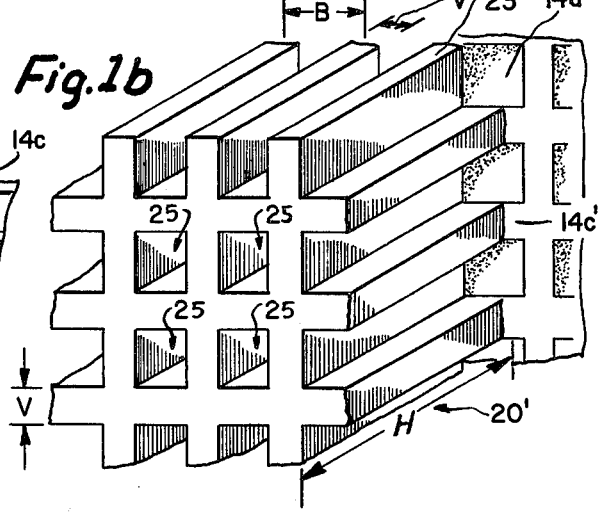
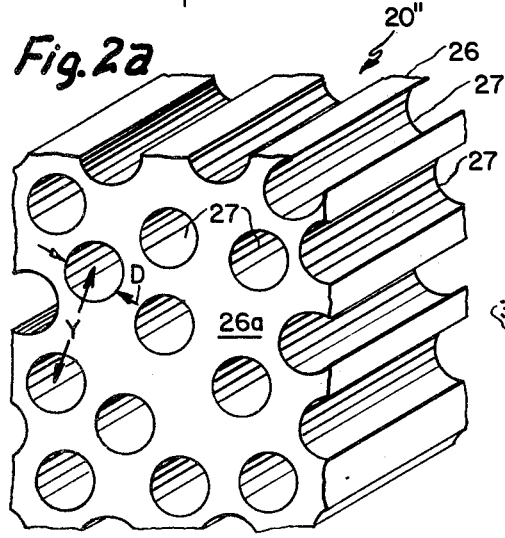
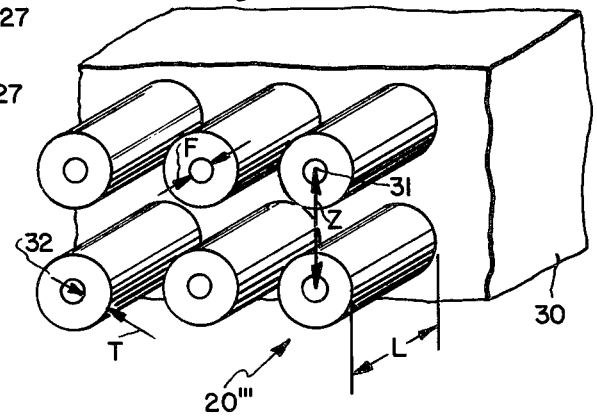

APPARATUS FOR X-RAY RADIOGRAPHY

This is a division, of application Ser. No. 759,426, filed Jan. 14, 1977.

BACKGROUND OF THE INVENTION

The present invention relates to medical radiography and, more particularly, to novel apparatus for producing a radiograph of acceptable quality while decreasing the required X-ray exposure therefore.

Known electrostatic X-ray image recording devices may utilize a photocathode as a direct X-ray photoelectron emitter, as described by K. H. Reiss and G. Lange, *Phys. Med. Biol.*, 1973, Vol. 18, No. 5, pages 695–703. The device described therein is of the type consisting of a gas-filled chamber having a flat cathode spaced from a flat anode, with a voltage being applied between the cathode and anode. The flat cathode is made of, or coated with, a heavy metal. A sheet of insulative material, such as a plastic and the like, is positioned adjacent to the cathode-facing side of the anode. An X-ray image is directed onto the cathode for photoelectron emission responsive thereto; the photoelectrons are accelerated across the gas-filled gap and collide with gas molecules, forming electron-ion pairs and producing gain by an "avalanche effect" in the gas. As a result thereof, a pattern of electric charges is deposited on the plastic sheet in correspondence to the variable attenuated pattern of X-rays impingent upon the device. After exposure, the electrostatic charge pattern on the plastic sheet is developed by conventional electrophotographic techniques. The principal disadvantage of such a device is that only those X-rays which are absorbed within a few microns of a flat cathode surface can cause photoelectrons to be ejected into the gas gap. For example, in the case of a cathode formed of gold or lead, the effective X-ray photoelectron escape depth is less than 1000 A and the effective X-ray quantum absorption for such a thin layer is usually less than about 0.5%. This low effective X-ray quantum absorption value is maintained for flat cathodes fabricated of common photocathodic materials, including cesium iodide (CsI). As a result, the efficiency of a flat plate cathode is very poor and electrostatic X-ray images of good quanlity can be obtained from such a device only by utilizing high X-ray exposure dosages. Consequently, such a device is not practical for medical radiography where large X-ray dosages are harmful to the patient.

It is desirable to have an X-ray radiography device capable of reducing the X-ray exposure level to the patient while maintaining comparable radiograph quality and resolution.

BRIEF SUMMARY OF THE INVENTION

In accordance with the invention, novel apparatus for X-ray radiography comprises a spaced pair of conductive electrodes with a first electrode adapted to substantially transmit differentially-absorbed X-rays impingent thereon into the gap between the electrodes; a sheet of insulative material adjacent an inwardly-facing surface of the second electrode; means for forming an electric field directed from the second electrode to the first electrode; and a structured photocathode, i.e. one with a patterned array of photocathodic material, such as CsI and the like, fabricated upon the inwardly-facing surface of the first electrode for emitting electrons responsive to receipt of the differentially-absorbed X-rays.

The structured photocathode is arranged as a two-dimensional array of photocathodic material having a shape selected to include one of an array of substantially square columns of photocathode; a two-dimensional grid of photocathode having substantially square recesses therethrough; a block photocathode having cylindrical apertures formed therethrough by means of eutectic-growth-and-etch techniques; and a two-dimensional array of rods of a nonphotocathode material, formed by eutectic-growth-and-etch techniques, having an annular layer of photocathode material fabricated about each rod.

X-radiation, differentially attenuated by passage through an object to be studied, impinges through the first electrode to enter the structured photocathode and cause emission of photoelectrons toward the second electrode. The structured photocathode provides a large surface area for the electrons to escape and be accelerated by the electric field toward the second electrode for deposition upon the insulator sheet in patterns of charge, whereby subsequent development by known techniques provides a high definition X-ray radiograph.

Accordingly, it is one object of the present invention to provide novel apparatus having a structured photocathode for low-exposure X-ray radiography.

This and other objects of the present invention will become more apparent upon a consideration of the following description and the accompanying drawings.

BRIEF DESCRIPTION OF THE DRAWINGS

FIG. 1 is a side view of a novel X-ray radiography apparatus in accordance with the principles of the present invention;

FIGS. 1a and 1b are oblique views of two possible structured photocathodes for use in the apparatus of the present invention; and FIGS. 2a and 2b are oblique views of portions of other embodiments of photoconductors produced by eutectic growth techniques, suitable for use in the apparatus of the present invention.

DETAILED DESCRIPTION OF THE INVENTION

Referring initially to FIG. 1, X-ray radiography apparatus 10 receives X-radiation 11 from a source (not shown for purposes of simplicity). The radiation is selectively attenuated by passage through an object 12 to be studied. Thus, X-ray photons 11a do not pass through the object and are not differentially absorbed, while X-ray photons 11b and 11c, respectively, must traverse respectively lesser and greater thicknesses of respective portions 12a and 12b of the object, to be differentially absorbed to some lesser or greater degree, respectively.

The differentially-absorbed X-radiation impinges upon an exterior surface 14a of a first conductive electrode 14, spaced a selected distance D from, and substantially parallel to, a second conductive electrode 15. Advantageously, at least first electrode 14 is formed of a light material, such as aluminum and the like, having substantially no absorption of X-ray photons having energies commonly encountered in medical diagnostic apparatus, e.g. on the order of 60 KeV. A source 16 of electrical potential of magnitude V is coupled between first and second electrodes 14 and 15 with polarity selected to form an electric field, in the direction of arrow E, from second electrode 15 to first electrode 14. A removable sheet 17 of an insulative material, such as a plastic and the like, is initially positioned essentially parallel to, and substantially in abutment with, the interior surface 15a of the second electrode. The gap 18 defined between first and second electrodes 14 and 15, respectively, is advantageously filled with an "avalanche-amplifying" gas, such as air, argon and the like, for charge multiplication.

A structured photocathode 20, preferably formed of a photocathodic material such as cesium iodide (CsI) and the like, is fabricated upon the inward surface 14b of first electrode 14 and extends a distance H (H<D) therefrom into gap 18 toward second electrode 15. Photocathode 20 is structured to have a geometry increasing the photoemitting (surface) area while simultaneously increasing the magnitude of X-ray absorption, i.e. the effective depth for electron emission responsive to receipt of an X-ray photon. In one preferred embodiment of structured photocathode (FIG. 1a), a column geometry is utilized. A grid pattern of grooves 14c is etched into surface 14b of the flat metal plate forming first electrode 14 to create a two-dimensional array of raised bases 14d, each having a substantially rectangular parallelopiped column 21 of cesium iodide fabricated thereon by structural growth techniques such as vacuum evaporation, hot wall evaporation and the like. Each column 21 preferably has a substantial square cross-section, with sides of width W, which may be on the order of 6 milli-inches; a slot 22, of dimension S on the order of 1 milli-inch, is formed between facing walls of adjacent columns. Thus, adjacent columns are spaced with a center-to-center distance A of about 7 milli-inches. The columns are fabricated with height H of about 10 milli-inches.

The differentially-absorbed X-ray photons impinge (FIG. 1) through first electrode 14 and are essentially absorbed in columns 21 of structured photocathode 20. An X-ray photon is absorbed by the photocathodic material, e.g. at a point P within one of columns 21, and photoelectrons 24 are emitted there from at an angle $\theta$ with respect to the elongated axis R of each block, which axis is substantially normal to the plane of first electrode 14. The photoelectrons are emitted either into the space 22 between the columns 21 or into gap 18 toward second electrode 15. Photoelectrons created near the surface of each column have a relatively high probability of escaping therefrom; the escape probability increases with photocathode surface area, hence structuring the photocathode to provide larger surface area provides greater photoelectron emission, relative to a flat photocathode. Photoelectrons 24 may be more or less energetic dependent respectively on formation thereof nearer or further from the surface of a column 21. The less energetic (slow or secondary) electrons emitted into slot 22 are extracted from that slot into the gap 18 by the applied electric field E. The more energetic (fast or primary) photoelectrons 24 emitted across a slot 22 into an adjacent column 21 will penetrate the photocathodic material of the adjacent column and create electron-ion pairs by energy loss, whereby primary electrons emitted at large angles $\theta$ are absorbed to prevent loss of resolution.

The electrons emitted into gap 18 are extracted towards second electrode 15 by the externally applied field E and are accelerated into the gap-filling gas to undergo "avalanche" amplification. The amplified pattern of electrons is deposited adjacent the most positive equipotential surface, i.e. the inwardly facing surface 17a of the sheet. The image of electrostatic charge thus formed upon insulative sheet 17 is then developed by conventional xerographic and the like techniques to form a visual image.

I have found that the X-ray induced photocurrent (in vacuum) for the columnar-structured cesium iodide photocathode 20 increases as a function of the strength of the electric field E until saturated at some maximum field strength, on the order of 3KV/cm. The X-ray photocurrent for a flat cesium iodide cathode, of about the same 10 milli-inches thickness, is found to be substantially independent of the strength of the electric field. The structured cesium iodide photocathode has a gain about 6 times greater than that of the flat cesium iodide photocathode, at a field strength of about 3000 V/cm., when illuminated by an X-ray source operated at about 84 kV$_p$.

Referring now to FIG. 1b, a second preferred structured photocathode embodiment 20' utilizes a substantially square grid 23 of photocathodic material having a two-dimensional array of substantially square apertures 25 formed therethrough. The grid is fabricated by etching corresponding substantially square areas 14d' into the interior-facing surface 14b of the first electrode and fabricating the photocathodic material upon the resulting raised grid pattern 14c'. It should be understood that a separate metal grid member may be used as the starting substrate for the grid structure, with the grid member being placed essentially parallel to, and in electrical connection with, first electrode 14.

I have found that a grid structure having a line-to-line separation distance B on the order of 17 microns, a photocathodic material width V on the order of 10 microns and a grid height H on the order of 100 microns provides an improvement in effective X-ray quantum absorption, relative to that of a flat photocathode using the same cesium iodide material, of about 35 times.

Referring now to FIGS. 2a and 2b, suitable structured CsI photocathodes may be formed by eutectic-growth techniques. A first grown, structured photocathode 20" (FIG. 2a) comprises a solid block 26 of the photocathodic material having a two-dimensional array of substantially cylindrical apertures 27 formed therethrough. The primary photoelectrons are emitted primarily from the surfaces of cylindrical apertures 27, although photoelectrons will be also emitted from that block face 26a closest to second electrode 15. The "perforated" photocathode of this embodiment is formed by growth from a eutectic composed substantially of about 45 mole percent sodium iodide (NaI) and about 55 mole percent cesium iodide, which eutectic has a melting point temperature of about 435° C. The eutectic grown from this melt has both lamela and rod-type structure. In the rod-type structure utilized for photocathode 20", the rods are composed of NaI, and are each about 10 microns in diameter D and have a typical center-to-center spacing distance Y on the order of 13 microns in the irregular array. The dimensions of the sodium iodide rods can be varied by changing the pulling rate of the eutectic from the melt; the NaI rods can be etched by liquids such as acetone and the like.

An alternate grown, structured photocathode embodiment 20''', shown in FIG. 2b, is formed by crystallizing a plate 30 of a eutectic of sodium fluoride (NaF) and sodium chloride NaCl, in the manner described by J. A. Batt et al in 48 *Ceramic Bulletin* 622 (1969). The crystallized eutectic forms a plurality of substantially parallel NaF rods 31 embedded in a matrix of NaCl. The ratio of NaF to NaCl, by volume, is fixed to be about 22.5% to 1 by the properties of this eutectic. The diameter F of the NaF rod can be controlled by establishing a desired cooling rate of crystallization; the center-to-center spacing Z between rods 31 is proportional to the rod diameter and the aforementioned fixed volume ratio. The sodium chloride matrix is etched away by water vapor to expose the sodium fluoride rod to a length L of about 6 milli-inches. A thin annular layer of cesium iodide, having a thickness T of about 5 microns is then fabricated, as by evaporation, hot-oven coating, cesium iodide solution-dipping techniques and the like, about the cylindrical surface of each rod 31, having a preferred diameter F on the order of 16 microns. Structured photocathode 20''' has an X-ray absorption of about 12% of the X-rays impinging thereon, which absorption is equivalent to that of a 1.5 milli-inch thick flat photocathode of cesium iodide. The effective photoemitting area of the plurality of substantially cylindrical photocathodes 32 increases to about 10 times that of a flat layer photocathode having the same overall while the small total diameter of the individual photocathode results in relatively good spatial resolution.

While the present invention has been described with reference to several preferred embodiments thereof, many variations and modifications will now become apparent to those skilled in the art. It is my intent, therefore, to be limited not by the scope of the present disclosure herein, but only by the scope of the appending claims.

What is claimed is:

1. Apparatus for X-ray radiography, comprising:

a first conductive planar electrode adapted to transmit a pattern of differentially-absorbed X-ray radiation;

a second conductive planar electrode spaced from, and parallel to, said first electrode;

a sheet of insulative material adjacent a surface of said second electrode facing said first electrode;

a structured photocathode fabricated as a block of X-ray photoemissive material directly upon the surface of said first electrode facing said second electrode, said block photoemissive material having a multiplicity of substantially randomly arranged apertures formed completely therethrough;

an avalanche-amplifying gas filling the gap between said insulative sheet and said structured photocathode and filling the volume of the apertures to first electrode surface;

means for forming an electric field between said first and second electrodes;

the photoemissive material of said photocathode emitting, responsive to said X-ray radiation, charged particles from the entire surface area thereof, said charged particles interacting with said gas and said field, respectively, for amplification and subsequent collection at said sheet.

2. Apparatus as set forth in claim 1, wherein said structured photocathode is formed of cesium iodide.

3. Apparatus as set forth in claim 1, wherein said apertures are substantially cylindrical.

4. Apparatus as set forth in claim 3, wherein the diameter of each aperture is on the order of 10 microns and the spacing between adjacent apertures is on the order of 13 microns.

* * * * *